(12) United States Patent
Lee

(10) Patent No.: US 7,420,290 B2
(45) Date of Patent: Sep. 2, 2008

(54) APPARATUS FOR CORRECTING DRIVING POWER OF VEHICLE ACTUATOR AND METHOD THEREOF

(75) Inventor: Byoung-Sang Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 96 days.

(21) Appl. No.: 11/012,250

(22) Filed: Dec. 16, 2004

(65) Prior Publication Data

US 2006/0055242 A1    Mar. 16, 2006

(30) Foreign Application Priority Data

Sep. 15, 2004    (KR) .................. 10-2004-0073781

(51) Int. Cl.
*B60L 3/00* (2006.01)
(52) U.S. Cl. .................................... 307/10.1
(58) Field of Classification Search ............... 307/10.1, 307/10.8
See application file for complete search history.

(56) References Cited

U.S. PATENT DOCUMENTS

| | | | | |
|---|---|---|---|---|
| 5,461,357 A | * | 10/1995 | Yoshioka et al. | 340/435 |
| 6,153,945 A | * | 11/2000 | Koss et al. | 307/10.1 |
| 6,366,038 B1 | * | 4/2002 | Bohm | 318/254 |
| 6,426,569 B1 | * | 7/2002 | Ichikawa et al. | 307/10.1 |
| 6,798,162 B2 | * | 9/2004 | Makaran et al. | 318/442 |
| 6,815,898 B2 | * | 11/2004 | Schenk et al. | 315/82 |
| 2004/0169968 A1 | * | 9/2004 | Mohr et al. | 361/33 |

* cited by examiner

*Primary Examiner*—Michael J Sherry
*Assistant Examiner*—Michael Rutland Wallis
(74) *Attorney, Agent, or Firm*—Greenblum & Bernstein, P.L.C.

(57) ABSTRACT

An apparatus to correct the driving power of an actuator in a vehicle includes a comparator that compares a battery voltage of the vehicle with a predetermined reference voltage. A controller adjusts and outputs a duty ratio of a Pulse Width Modulation (PWM) signal according to the compared result of the battery voltage and reference voltage. A switching element is switched on and off by the PWM signal and outputs the battery voltage after a transformation. An actuator operates by receiving the transformed battery voltage through the switching element. The actuator operates at a constant speed regardless of the variation of the battery voltage.

6 Claims, 2 Drawing Sheets

APPARATUS FOR CORRECTING DRIVING POWER OF VEHICLE ACTUATOR AND METHOD THEREOF

CROSS-REFERENCE TO RELATED APPLICATIONS

The present application is based on, and claims priority from, Korean Application Serial Number 10-2004-0073781, filed on Sep. 15, 2004, the disclosure of which is hereby incorporated by reference herein in its entirety.

FIELD OF THE INVENTION

The present invention relates to an apparatus that corrects the driving power of an actuator in a vehicle and a method thereof whereby the power provided to the actuator, which operates an active suspension control system, is corrected.

BACKGROUND OF THE INVENTION

Generally, a suspension system supports the weight of a vehicle and absorbs and dampens out road shocks. The suspension system, therefore, allows the vehicle to travel over rough surfaces with minimal up and down body movement. This improves the vehicle ride of the occupants and load in the vehicle and reduces dynamic stress of each portion of the vehicle body and wheel vibration, thereby increasing the driving stability.

An Active Geometry Controlled Suspension (AGCS) system among the suspension systems adjusts the rear wheels to a toe-in setting during the turn by elongating or shortening the length of a rear control arm, thereby minimizing the vehicle roll and improving the maneuverability.

An AGCS Electronic Control Unit (ECU) pre-determines the bump of the vehicle by receiving detection values from a steering angle sensor and vehicle speed sensor to thereby obtain a steering stability against the bump on exterior wheels when the vehicle makes a turn. Then, the AGCS ECU provides battery power to an actuator of the exterior rear wheel through a switched relay to operate the actuator, thereby obtaining the steering safety by toe-in adjustment of the exterior rear wheels.

However, there is a drawback in that as the conventional AGCS system provides the battery power to the actuator of the rear wheels to operate the actuator, when the load of the battery power varies (particularly, when an instantaneous power drop occurs while switching on the air-conditioner or lights), the greatly varied battery voltage is transmitted to the actuator and changes the operation speed of the actuator, thus destabilizing the steering of the vehicle.

SUMMARY OF THE INVENTION

Embodiments of the present invention are provided to operate various actuators in the vehicle at a constant speed regardless of the variation of the battery voltage, thereby stabilizing the vehicle.

An apparatus to correct the driving power of an actuator in a vehicle includes a comparator that compares the battery voltage of the vehicle with a predetermined reference voltage. A controller adjusts and outputs a duty ratio of a Pulse Width Modulation (PWM) signal according to the compared result of the battery voltage and reference voltage. A switching element is switched on and off by the PWM signal and outputs the battery voltage after a transformation. An actuator operates by receiving the transformed battery voltage through the switching element.

The controller increases the duty ratio of the PWM signal if the battery voltage is less than the reference voltage as a result of the compared result to thereby prevent a slow operation speed of the actuator due to low battery voltage. The controller decreases the duty ratio of the PWM signal if the battery voltage is greater than the reference voltage as a result of the compared result to thereby prevent a fast operation speed of the actuator due to high battery voltage.

A method to correct the driving power of an actuator in a vehicle includes: comparing the battery voltage of the vehicle with a predetermined reference voltage; decreasing the duty ratio of a Pulse Width Modulation (PWM) signal if the battery voltage is greater than the reference voltage, and increasing the duty ratio of the PWM signal if the battery voltage is less than the reference voltage; and transforming and providing the battery voltage to an actuator by a switching operation according to the adjusted PWM signal.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Figure 1:
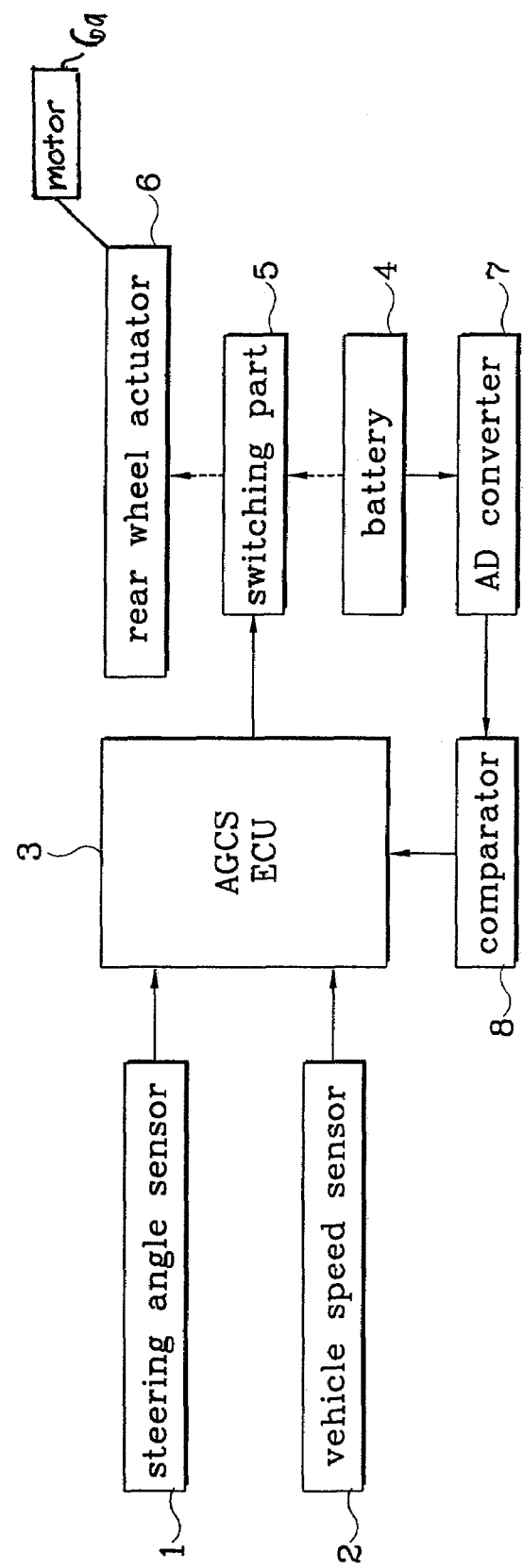
FIG. 1 is a block diagram of an apparatus to correct an actuator driving power of a vehicle according to an embodiment of the present invention.

Referring now to FIG. 1, a steering angle sensor 1 detects a steering angle of a vehicle and inputs the result into an Active Geometry Controller Suspension Electronic Control Unit (AGCS ECU) 3. A vehicle speed sensor 2 detects the speed of the vehicle to be input into the AGCS ECU 3.

An AD converter 7 converts the voltage of a battery 4 into a digital signal and inputs the signal into a comparator 8. The comparator 8 compares the battery voltage (input from the AD converter 7) with a predetermined reference voltage and inputs the compared result into the AGCS ECU 3. The predetermined reference voltage may be any suitable voltage and in the present embodiment is preferably 13V.

The AGCS ECU 3 pre-determines the vehicle bump or jolt by receiving signals from the steering angle sensor 1 and vehicle speed sensor 2 and outputs a Pulse Width Modulation (PWM) signal for operating a switching element 5, which provides the power to a rear wheel actuator 6. A duty ratio of the PWM signal is determined by the compared result of the battery voltage and reference voltage input from the comparator 8.

If the battery voltage and reference voltage are identical, the AGCS ECU 3 outputs a PWM signal of a reference duty ratio (preferably 50% of the duty ratio). If the battery voltage is greater than the reference voltage, the AGCS ECU 3 decreases the duty ratio of the PWM signal from the reference duty ratio while increasing the duty ratio from the reference duty ratio if the battery voltage is less than the reference voltage. Thus, a constant operation speed of the rear wheel actuator 6 is obtained by constantly maintaining the voltage provided to the rear wheel actuator 6.

The AGCS ECU 3 may preferably use a map table (which is preset with duty ratios according to the voltage difference) to determine the duty ratio of the PWM signal.

The switching element 5 is switched on and off by the PWM signal (outputted from the AGCS ECU 3) and provides the voltage of the battery 4 to the rear wheel actuator 6 after transforming the battery voltage into a constant voltage. The rear wheel actuator 6 operates at a constant speed by receiving the constant battery voltage through the switching element 5. The rear wheel actuator 6 preferably includes a motor 6a that operates by receiving the power through the switching element 5.

Figure 2:
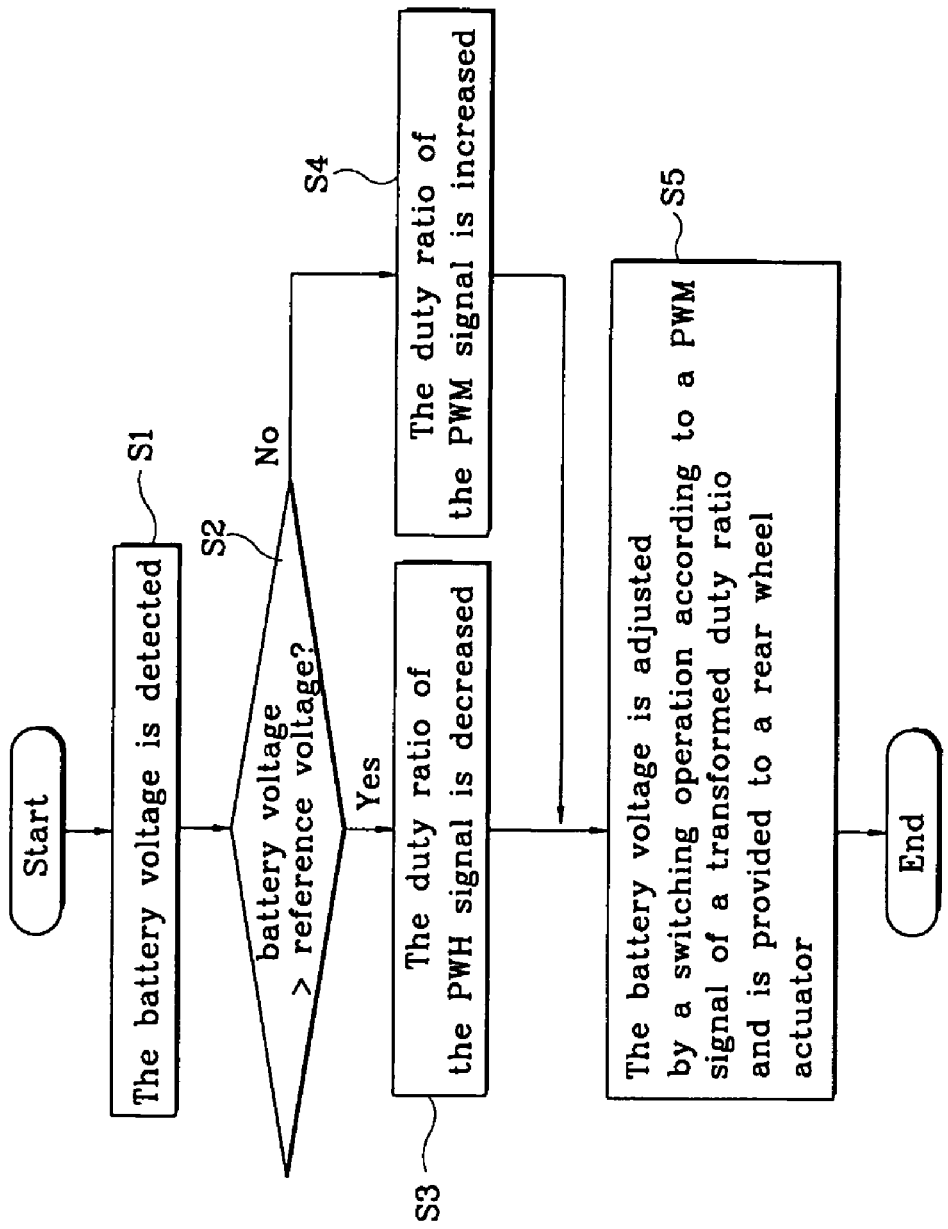
FIG. 2 is a flowchart of a method to correct an actuator driving power of a vehicle according to an embodiment of the present invention.

With reference to FIG. 2, a method to correct the driving power of a vehicle actuator according to the embodiment of the present invention will now be described.

The AD converter 7 detects the voltage of the battery 4 and converts the voltage into a digital signal (Step 1). The comparator 8 compares the battery voltage (converted into a digital signal) with a predetermined reference voltage (preferably 13V) (Step 2). If the voltage of the battery 4 exceeds the predetermined reference voltage as a result of step 2, then the AGCS ECU 3 reduces the duty ratio of a PWM signal, which switches on or off the switching element 5 (Step 3). If the voltage of the battery 4 is less than the predetermined reference voltage as a result of step 2, then the AGCS ECU 3 increases the duty ratio of the PWM signal, which switches on and off the switching element 5 (Step 4). The voltage of the battery 4 is transformed to a constant voltage and is provided to the rear wheel actuator 6 through the switching element 5, which is switched on or off by the PWM signal, thus the rear wheel actuator 6 operates at a constant speed regardless of the voltage variation of the battery 4 (Step 5).

As apparent from the foregoing, there is an advantage in that various actuators equipped in the vehicle operate at a steady speed regardless of the variation of the battery voltage.

What is claimed is:

1. An apparatus for correcting the driving power of an actuator in a vehicle, comprising:
    a steering angle sensor;
    a vehicle speed sensor;
    a comparator that compares a battery voltage of the vehicle with a predetermined reference voltage;
    a controller that adjusts and outputs a duty ratio of a Pulse Width Modulation (PWM) signal according to the compared result of said battery voltage and said reference voltage, wherein the controller is configured to receive signals from said steering angle sensor and said vehicle speed sensor;
    a switching part that is switched on and off by the PWM signal and outputs said battery voltage after a transformation; and
    a wheel actuator that operates by receiving said transformed battery voltage through said switching part, wherein the wheel actuator includes a motor which is configured to operate by receiving power through the switching part, and wherein the wheel actuator is configured to supply a force which moves a wheel of the vehicle.

2. The apparatus as defined in claim 1, wherein said controller increases the duty ratio of the PWM signal when said battery voltage is less than said reference voltage as a result of the compared result.

3. The apparatus as defined in claim 1, wherein said controller decreases the duty ratio of the PWM signal when said battery voltage is greater than said reference voltage as a result of the compared result.

4. The apparatus according to claim 1, wherein the signals received by the controller from said steering angle sensor and said vehicle speed sensor are utilized by the controller to pre-determine either one of a vehicle bump or jolt.

5. A method for correcting the driving power of an actuator in a vehicle, comprising:
    sensing a steering angle;
    sensing a vehicle speed;
    comparing a battery voltage of the vehicle with a predetermined reference voltage;
    providing a controller which controls an adjustment and output of a duty ratio of a Pulse Width Modulation (PWM) signal according to the compared result of the battery voltage and the reference voltage, the controller receiving signals corresponding to the sensed steering angle and the sensed vehicle speed;
    decreasing a duty ratio of the PWM signal when the battery voltage is greater than the reference voltage, and increasing the duty ratio of the PWM signal when the battery voltage is less than the reference voltage; and
    transforming and providing the battery voltage to a wheel actuator by a switching operation according to the adjusted PWM signal, the wheel actuator including a motor which is configured to operate by receiving power through the switching operation, the wheel actuator being configured to supply a force which moves a wheel of the vehicle.

6. The method according to claim 5, further comprising:
    utilizing the received signals to pre-determine either one of a vehicle bump or jolt.

* * * * *